United States Patent
Ando et al.

(10) Patent No.: US 8,964,335 B2
(45) Date of Patent: Feb. 24, 2015

(54) HEAD SUSPENSION WITH PIEZOELECTRIC ELEMENT SUPPORT HAVING ELECTRICALLY INSULATIVE ADHESIVE LAYER

(71) Applicant: NHK Spring Co., Ltd., Yokohama-shi, Kanagawa (JP)

(72) Inventors: Toshiki Ando, Kanagawa (JP); Hideki Fuchino, Kanagawa (JP); Tsutomu Fukuda, Kanagawa (JP); Emi Sugimoto, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 14/072,315

(22) Filed: Nov. 5, 2013

(65) Prior Publication Data

US 2014/0055885 A1 Feb. 27, 2014

Related U.S. Application Data

(62) Division of application No. 12/571,609, filed on Oct. 1, 2009, now Pat. No. 8,630,067.

(30) Foreign Application Priority Data

Oct. 3, 2008 (JP) ................................. 2008-259065

(51) Int. Cl.
| | |
|---|---|
| *G11B 21/10* | (2006.01) |
| *G11B 5/48* | (2006.01) |
| *G11B 5/55* | (2006.01) |
| *G11B 5/596* | (2006.01) |

(52) U.S. Cl.
CPC ............ *G11B 5/4873* (2013.01); *G11B 5/4826* (2013.01); *G11B 5/5552* (2013.01)

USPC .......................................................... 360/294.4

(58) Field of Classification Search
CPC ....................................................... G11B 5/4873
USPC .......................................................... 360/294.4
See application file for complete search history.

(56) References Cited

U.S. PATENT DOCUMENTS

| | | | |
|---|---|---|---|
| 6,327,120 B1 | 12/2001 | Koganezawa et al. | |
| 2001/0043443 A1* | 11/2001 | Okamoto et al. | ............ 360/294 |
| 2002/0064001 A1 | 5/2002 | Shiraishi et al. | |
| 2002/0075606 A1 | 6/2002 | Nishida et al. | |

(Continued)

FOREIGN PATENT DOCUMENTS

| | | |
|---|---|---|
| JP | 2001-339967 | 12/2001 |
| JP | 2002-050140 | 2/2002 |
| JP | 2002-184140 | 6/2002 |

*Primary Examiner* — Craig A. Renner
(74) *Attorney, Agent, or Firm* — Jordan and Hamburg LLP

(57) ABSTRACT

A head suspension 31 has a piezoelectric element 13 that deforms in response to a voltage applied thereto, a base plate 33 having an attaching part to which the piezoelectric element 13 is attached, and a load beam 35 having a flexure 39. A front end of the load beam 35 moves in a sway direction according to the deformation of the piezoelectric element 13. The head suspension 31 includes adhesives that attach the piezoelectric element 13 to the attaching part. The adhesives are applied to and hardened at the attaching part one by one. At least one of the adhesives that is first applied to and hardened at the attaching part is electrically insulative. The head suspension 31 properly maintains electric insulation between the piezoelectric element 13 and the attaching part, sufficiently demonstrates original functions, and secures a rigidity balance and proper vibration characteristic.

1 Claim, 9 Drawing Sheets

(56) References Cited

U.S. PATENT DOCUMENTS

| | | | |
|---|---|---|---|
| 2002/0080532 A1* | 6/2002 | Fujiwara et al. | 360/294.4 |
| 2002/0089793 A1 | 7/2002 | Nakagawa et al. | |
| 2002/0171968 A1* | 11/2002 | Nakagawa | 360/75 |
| 2003/0123196 A1 | 7/2003 | Shiraishi et al. | |
| 2009/0086379 A1* | 4/2009 | Hanya et al. | 360/294.4 |
| 2010/0067151 A1* | 3/2010 | Okawara et al. | 360/294 |
| 2010/0073824 A1* | 3/2010 | Nojima | 360/294.4 |
| 2010/0073825 A1* | 3/2010 | Okawara | 360/294.4 |

* cited by examiner

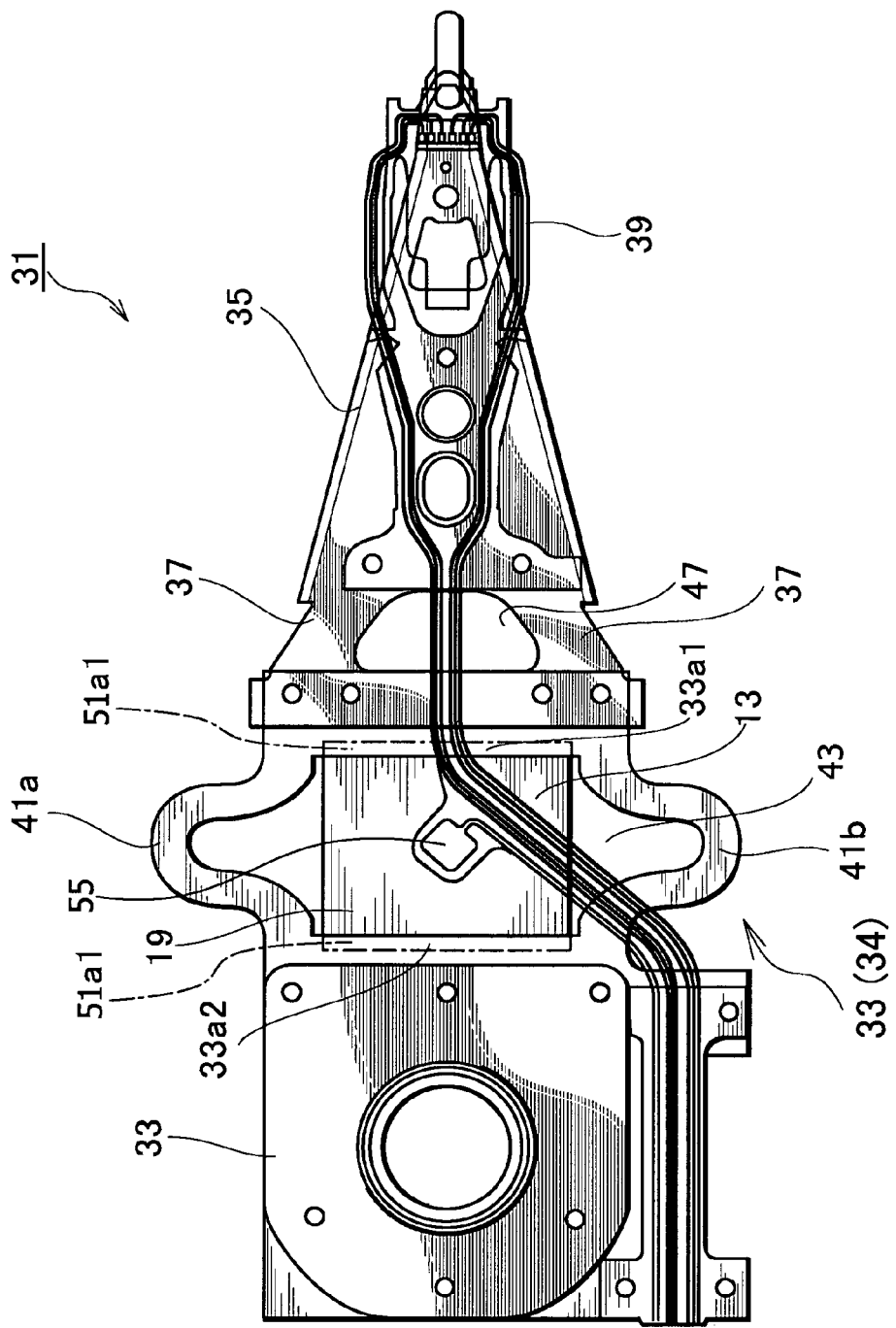

HEAD SUSPENSION WITH PIEZOELECTRIC ELEMENT SUPPORT HAVING ELECTRICALLY INSULATIVE ADHESIVE LAYER

REFERENCE TO RELATED APPLICATION

This is a divisional application of Ser. No. 12/571,609, filed Oct. 1, 2009, currently allowed. The subject matter of the aforementioned prior application is hereby incorporated herein by reference.

BACKGROUND OF THE INVENTION

1. Field of the Invention

The present invention relates to a head suspension having a piezoelectric element that is attached to the head suspension with an electrically insulative adhesive and is deformed in response to a voltage applied thereto. The present invention also relates to a method of manufacturing such a head suspension.

2. Description of Related Art

Small-sized, precision information devices are rapidly advancing, and for such devices, needs are increasing for micro-actuators capable of conducting positioning control for very small distances. The devices that particularly need such micro-actuators include optical systems for correcting focuses and inclination angles, ink jet printers for controlling ink heads, and magnetic disk drives for controlling magnetic heads.

The magnetic disk drives have an urgent issue to solve, i.e., increasing storage capacity. The storage capacity of a magnetic disk drive will increase if the storage capacity of each magnetic disk in the magnetic disk drive increases. The storage capacity or recording density of the magnetic disk will increase, without changing the diameter thereof, if the number of tracks per inch (TPI) on the magnetic disk increases. For this, the width of each track on the magnetic disk must be narrowed. To handle such narrow tracks on a magnetic disk, a magnetic head of a head suspension in the magnetic disk drive must conduct precise positioning in a direction across the tracks. For realizing the precise positioning, there is a need of an actuator capable of accurately moving and positioning the magnetic head of the head suspension within a very small area.

To meet the need, the applicant of the present invention has proposed in Japanese Unexamined Patent Application Publication No. 2002-50140 a head suspension for a disk drive. This head suspension includes a base plate, a connection plate having a hinge thinner than the base plate, a load beam provided with a flexure and a magnetic head, and a pair of piezoelectric elements.

This related art employs a dual actuator system for positioning the magnetic head. The dual actuator system involves a voice coil motor and the pair of piezoelectric elements each made of PZT (lead zirconate titanate).

The piezoelectric elements minutely drive a front end of the load beam in a widthwise direction (sway direction) of the head suspension. Compared with a single actuator system employing only the voice coil motor, the dual actuator system employing the voice coil motor and piezoelectric elements more precisely positions the magnetic head attached to the front end of the head suspension.

An important issue for the head suspension employing the dual actuator system is how to mount the piezoelectric elements on the head suspension.

As an approach to address the issue, the applicant of the present invention has proposed in Japanese Unexamined Patent Application Publication No. 2002-184140 a head suspension for a disk drive (in particular, an adhesive layer 80 in paragraphs 0024 to 0026 and FIG. 5). The head suspension includes a load beam, a flexure attached to the load beam, an actuator base including a base plate, and a pair of piezoelectric elements. The actuator base has an attaching part to which the pair of piezoelectric elements is attached through the adhesive layer that is electrically insulative.

According to this related art, the piezoelectric elements are set at a predetermined position on the actuator base with a gap being secured between the piezoelectric elements and the actuator base and the adhesive is applied into the gap.

If the quantity of the adhesive applied into the gap is too small, electrical insulation will be insufficient between the piezoelectric elements and the actuator base. If the adhesive quantity is too large, the applied adhesive will ooze and spread.

Namely, if the applied adhesive is too small, an insulation failure will occur between the piezoelectric elements and the actuator base, to deteriorate functions of the head suspension. If the applied adhesive is too large, the adhesive will ooze and spread to reach the flexure of the load beam, to deteriorate the rigidity balance and vibration characteristic of the head suspension.

SUMMARY OF THE INVENTION

An object of the present invention is to provide a head suspension capable of properly maintaining electrical insulation between a piezoelectric element and an attaching part of the head suspension to which the piezoelectric element is attached and sufficiently perform original functions of the head suspension. Another object of the present invention is to provide a method of manufacturing such a head suspension.

In order to accomplish the objects, an aspect of the present invention provides a head suspension having a piezoelectric element that deforms in response to a voltage applied thereto, a base having an opening serving as an attaching part to which the piezoelectric element is attached, and a load beam that is fixed to the base so that a front end of the load beam moves in a sway direction according to the deformation of the piezoelectric element. The head suspension includes a support formed in the opening, configured to support an electrode surface of the piezoelectric element; and a plurality of adhesive layers formed on the support, to fix the piezoelectric element to the support, one of the adhesive layers that is in contact with the support being electrically insulative.

This aspect of the present invention employs the plurality of adhesive layers to fix the piezoelectric element to the support that supports an electrode face of the piezoelectric element. One of the adhesive layers that is in contact with the support is electrically insulative. This aspect secures electrical insulation between the piezoelectric element and the attaching part and allows the head suspension to fully function.

BRIEF DESCRIPTION OF THE DRAWINGS

FIG. 4 is a bottom view illustrating the head suspension of FIG. 1;

DETAILED DESCRIPTION OF EMBODIMENTS

Head suspensions and methods of manufacturing head suspensions according to embodiments and modifications of the present invention will be explained in detail with reference to the drawings.

Figure 1:
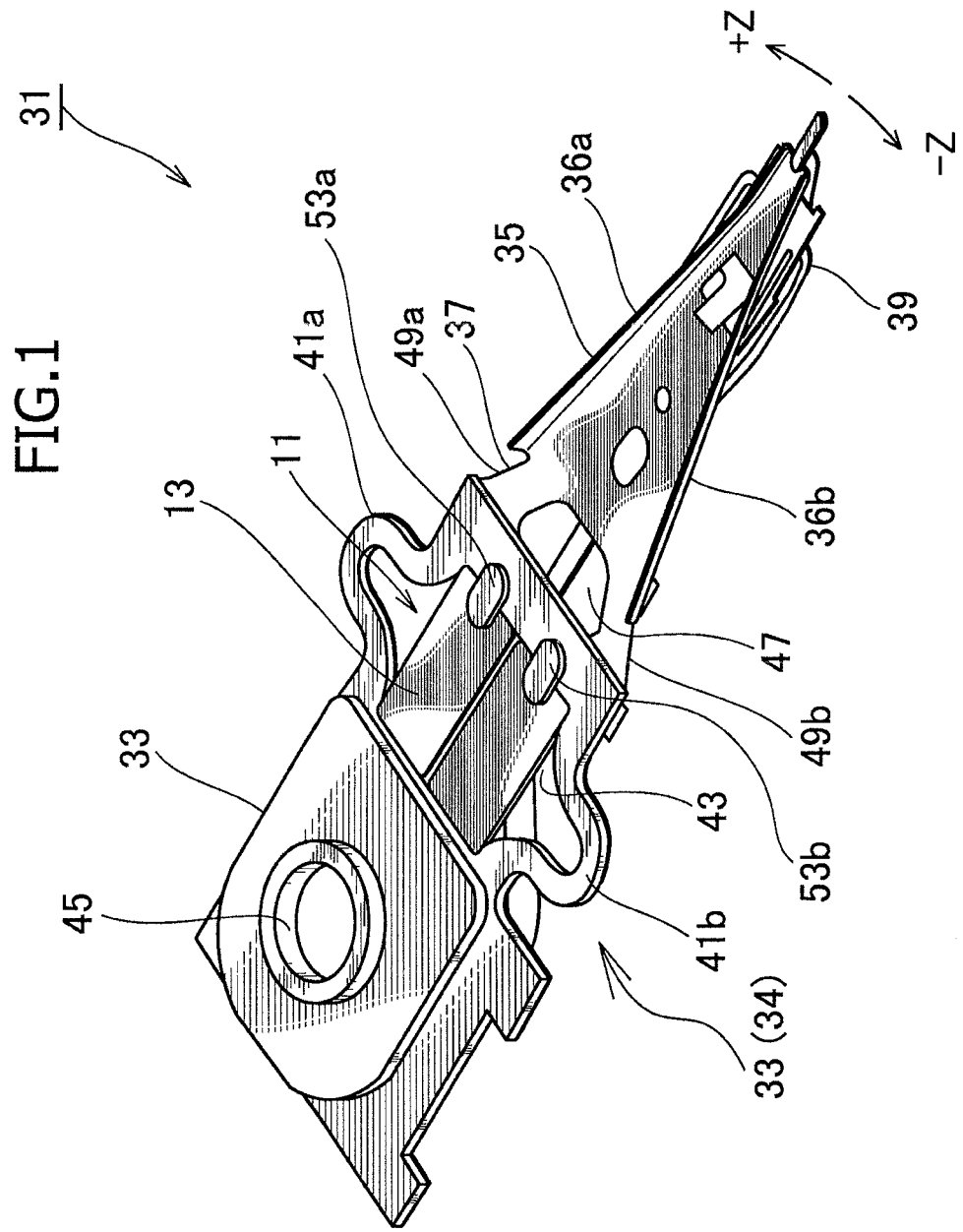
FIG. 1 is a perspective view illustrating a head suspension according to an embodiment of the present invention.

FIG. 1 is a perspective view illustrating a head suspension 31 according to an embodiment of the present invention.

The head suspension 31 includes a piezoelectric actuator 11 consisting of a piezoelectric element 13 that deforms in response to a voltage applied thereto, a base plate 33 (corresponding to the "base" stipulated in the claims), a load beam 35, a connection plate 37 functioning as a hinge, and the like.

The base plate 33 has an opening 43 (corresponding to the "attaching part" stipulated in the claims) in which the piezoelectric element 13 is embedded. The piezoelectric element 13 deforms in response to an applied voltage, to move a front end of the load beam 35 in a sway direction, i.e., a widthwise direction of the head suspension 31.

The base plate 33 is made of, for example, a stainless steel thin plate having a thickness of about 150 to 200 μm. The base plate 33 includes a pair of flexible parts 41a and 41b each having a U-shape, the opening 43 for accommodating the piezoelectric element 13, and a circular boss 45. The flexible parts 41a and 41b each are outwardly curved at a location corresponding to a side face of the piezoelectric element 13. The base plate 33 is fixed to a front end of an actuator arm (not illustrated) that is turned by a voice coil motor (not illustrated).

The base plate 33 may be made of light metal such as aluminum alloy or a clad material consisting of light metal and stainless steel. The light metal may reduce the inertia of the base plate 33, increase the resonant frequency of the head suspension 31 in a sway direction, and improve the tracing performance of the head suspension 31.

Instead of providing the base plate 33 with the flexible parts 41a and 41b and opening 43, an actuator plate 34 having the flexible parts 41a and 41b and opening 43 may be used. In this case, a rear end of the actuator plate 34 is laid on the base plate 33 and is fixed thereto by, for example, laser welding.

The head suspension 31 may employ both the base plate 33 and actuator plate 34, or only the base plate 33. In the following explanation, the actuator plate 34 is considered to be integral with the base plate 33 for the sake of simplicity of explanation.

The load beam 35 has a flexure 39. The flexure 39 is made of a metal thin plate spring that is thinner and more accurate than the load beam 35. A front end of the flexure 39 is provided with a slider (not illustrated) having a magnetic head. The load beam 35 is made of a stainless steel plate having a thickness of about 30 to 150 μm and is designed to apply load onto the slider. The load beam 35 has bent edges 36a and 36b to improve the rigidity of the load beam 35. A rear end of the load beam 35 is integral with the connection plate 37.

The load beam 35 may be made of light metal such as aluminum alloy or a clad material consisting of light metal and stainless steel. The light metal may reduce the inertia of the load beam 35, increase the resonant frequency of the head suspension 31 in a sway direction, and improve the tracing performance of the head suspension 31.

The connection plate 37 is made of a resilient metal plate having a thickness of about 30 μm. A part of the connection plate 37 has a hole 47 to reduce the rigidity thereof in a thickness direction. On each side of the hole 47, there are hinges 49a and 49b that bend in the thickness direction. A rear end of the connection plate 37 is laid on a front end of a bottom face of the base plate 33 and is fixed thereto by, for example, laser welding.

The piezoelectric actuator 11 attached to the head suspension 31 will be explained.

Figure 2:
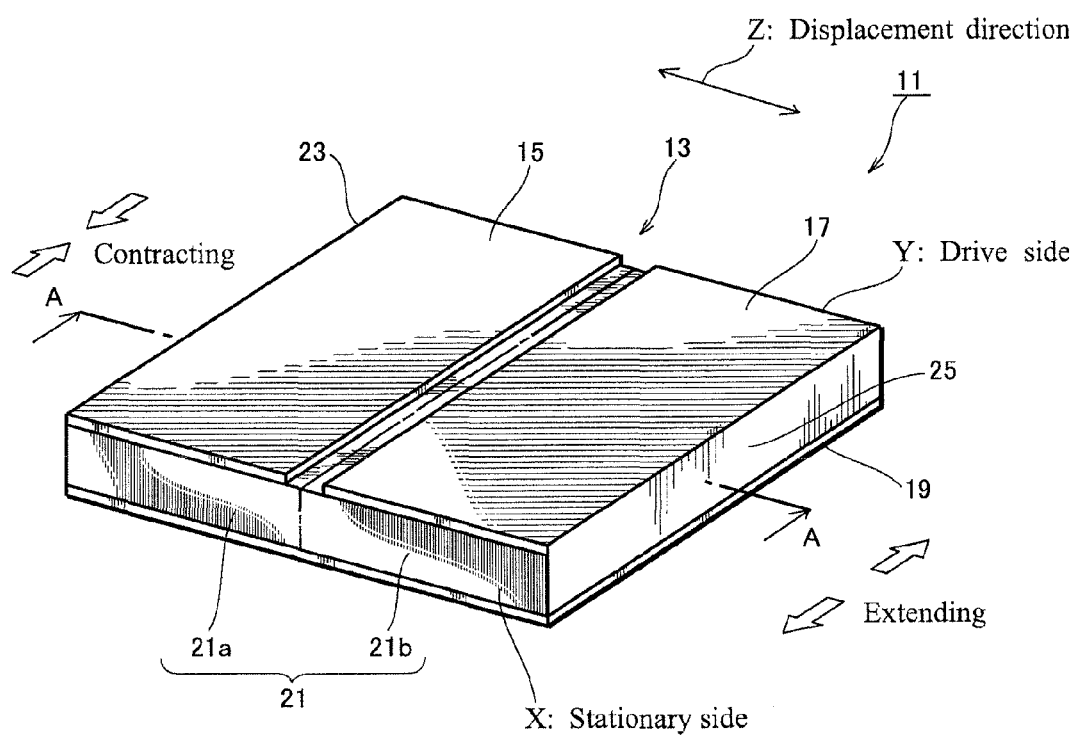
FIG. 2 is a perspective view illustrating a piezoelectric actuator arranged in the head suspension of FIG. 1.
Figure 3:
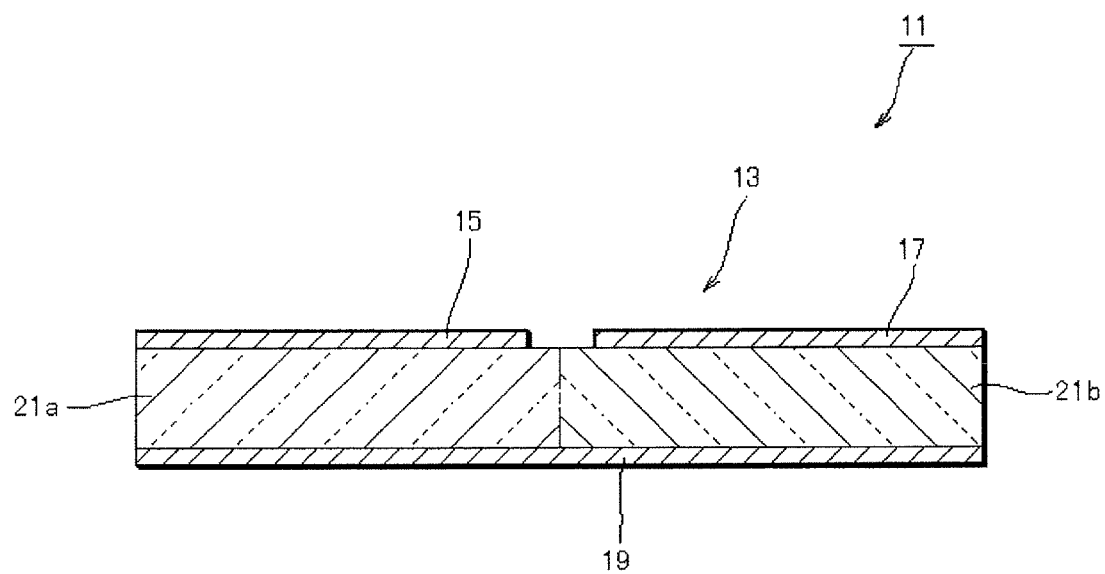
FIG. 3 is a sectional view taken along a line A-A of FIG. 2.

FIG. 2 is a perspective view illustrating the piezoelectric actuator 11 fitted to the head suspension 31 and FIG. 3 is a sectional view taken along a line A-A of FIG. 2.

The piezoelectric actuator 11 consists of the piezoelectric element 13 substantially having a rectangular shape. The piezoelectric element 13 deforms in response to an applied voltage, to drive an objective part (the load beam 35). More precisely, the piezoelectric element 13 deforms when a voltage is applied thereto, or when the voltage applied thereto is stopped, or according to the level of a voltage applied thereto.

The piezoelectric element 13 includes first and second electrodes 15 and 17 that are arranged in a common plane and are separated from each other by a predetermined distance, a common electrode 19 opposing the first and second electrodes 15 and 17, and a piezoelectric material 21 arranged between the first and second electrodes 15 and 17 and the common electrode 19.

The first and second electrodes 15 and 17 and common electrode 19 may be made of metal having a low contact resistance, such as gold (Au). The first and second electrodes 15 and 17 substantially have the same shape and size. The common electrode 19 is substantially equal in size and shape to a combination of the first and second electrodes 15 and 17.

The piezoelectric material 21 consists of a first piezoelectric material 21a that deforms according to a voltage applied to the first electrode 15 and a second piezoelectric material 21b that deforms according to a voltage applied to the second electrode 17. The first and second piezoelectric materials 21a and 21b are arranged so that they are oppositely polarized. The first and second piezoelectric materials 21a and 21b are made of, for example, piezoelectric ceramics that are polarized in polarization directions differing from each other by 180 degrees.

Operation of the piezoelectric actuator 11 will be explained. In FIG. 2, a side of the piezoelectric element 13 marked with "X" is a stationary side, a side marked with "Y" is a drive side, the first and second electrodes 15 and 17 are grounded, and the common electrode 19 receives a voltage.

When receiving the voltage, the piezoelectric element 13 deforms into a trapezoid with an end face 23 of the first electrode 15 contracting and an end face 25 of the second electrode 17 extending. As a result, the piezoelectric element 13 moves in a direction Z (FIG. 2) by a very small distance, to move the part (load beam 35) attached to the drive side Y of the piezoelectric element 13.

When the common electrode 19 is grounded and the first and second electrodes 15 and 17 receive a voltage, the piezoelectric element 13 moves in a direction −Z (opposite to the direction Z) by a minute distance, to displace the part (load beam 35) attached to the drive side Y of the piezoelectric element 13.

The piezoelectric actuator 11 needs three electric systems for the first and second electrodes 15 and 17 and common electrode 19. This configuration simplifies wiring to the piezoelectric element 13 and secures the reliability thereof.

The piezoelectric actuator 11 has the single piezoelectric element 13, to reduce the number of parts, minimize parts management, and reduce the cost of the head suspension 31.

The head suspension 31 will be explained further.

Figure 5A:
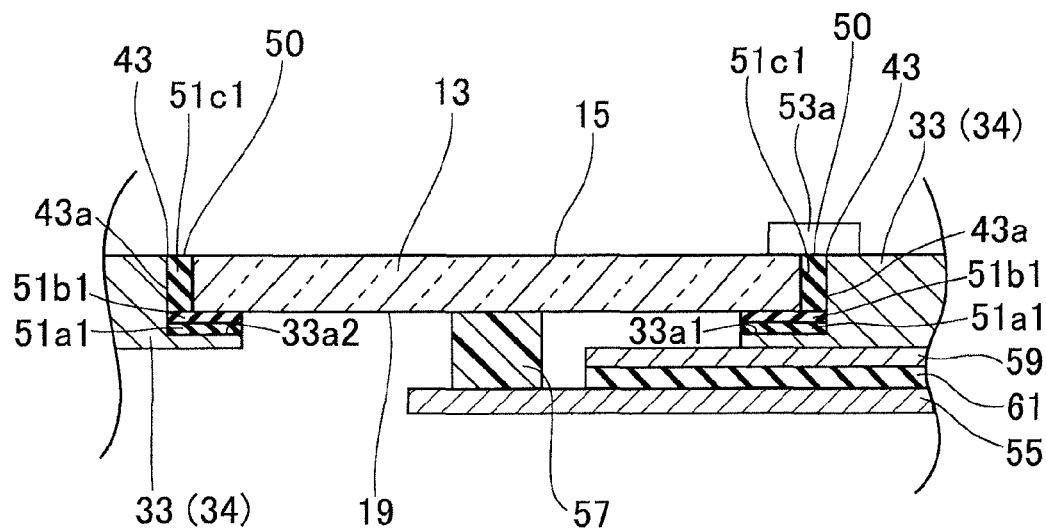
FIG. 5A is a sectional view partly illustrating layered adhesives at an opening (attaching part) of the head suspension of FIG. 1.
Figure 5B:
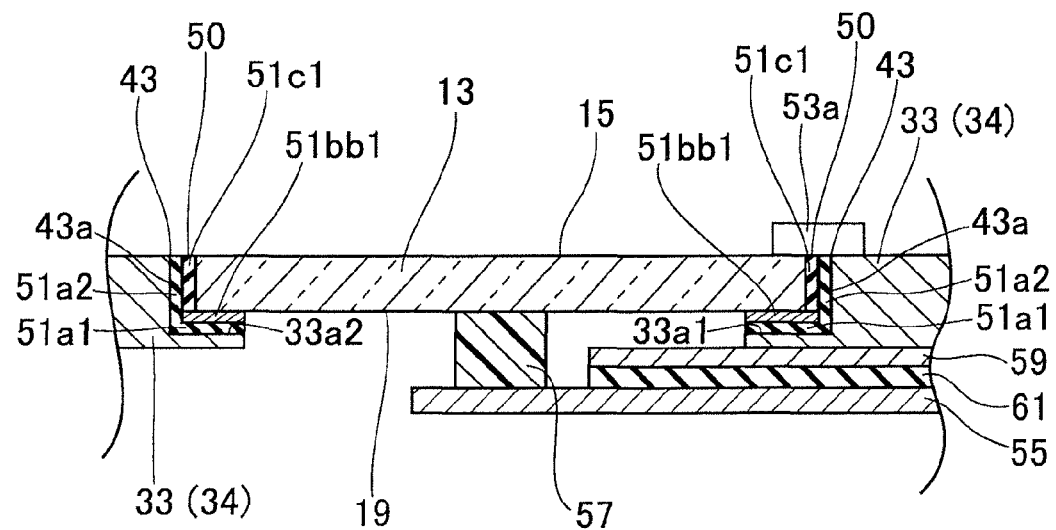
FIG. 5B is a sectional view partly illustrating layered adhesives according to a modification of the embodiment illustrated in FIG. 5A.
Figure 6:
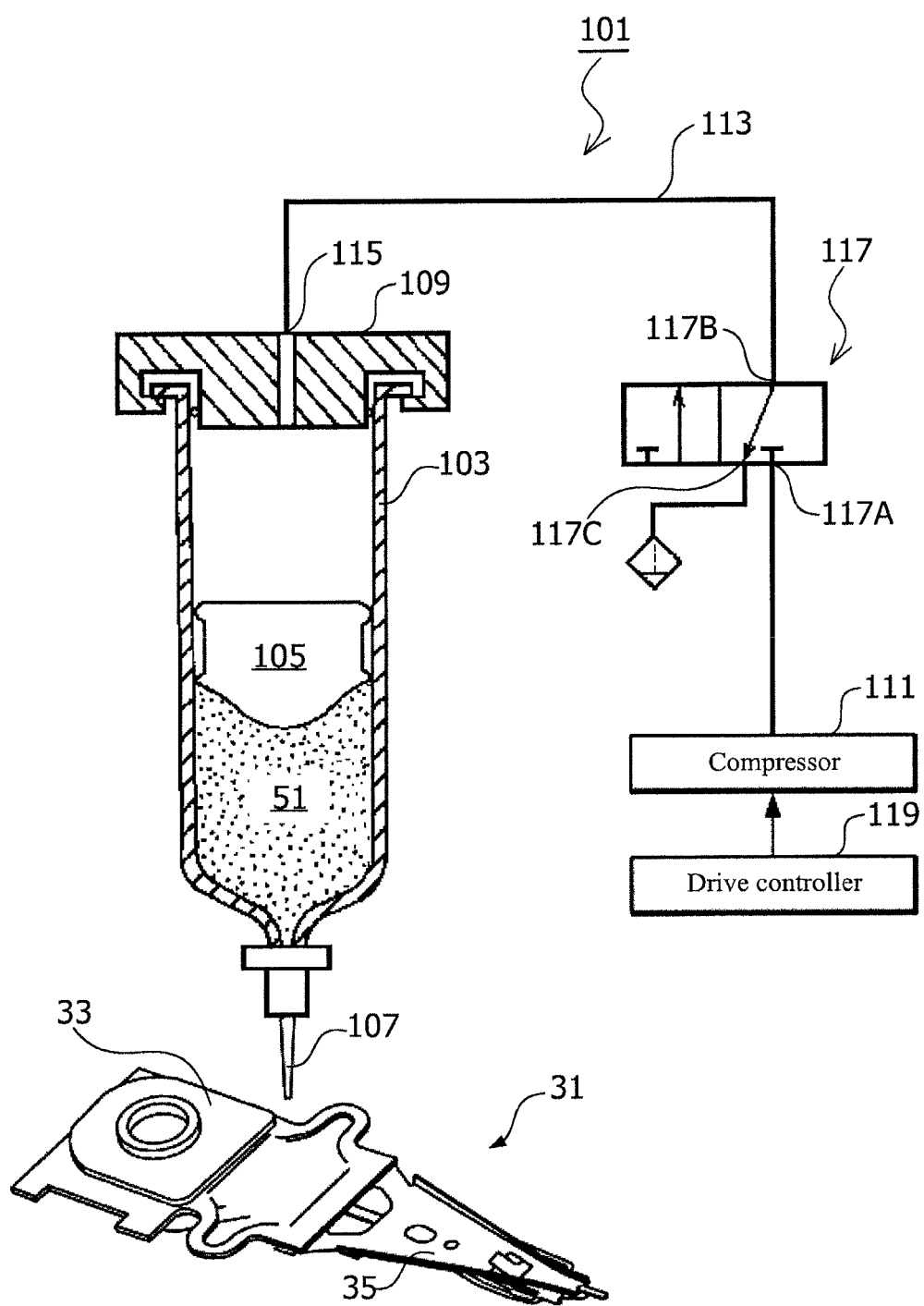
FIG. 6 is a schematic view illustrating an adhesive applying system used to apply an adhesive to the piezoelectric element attaching part of the head suspension.
Figure 7:
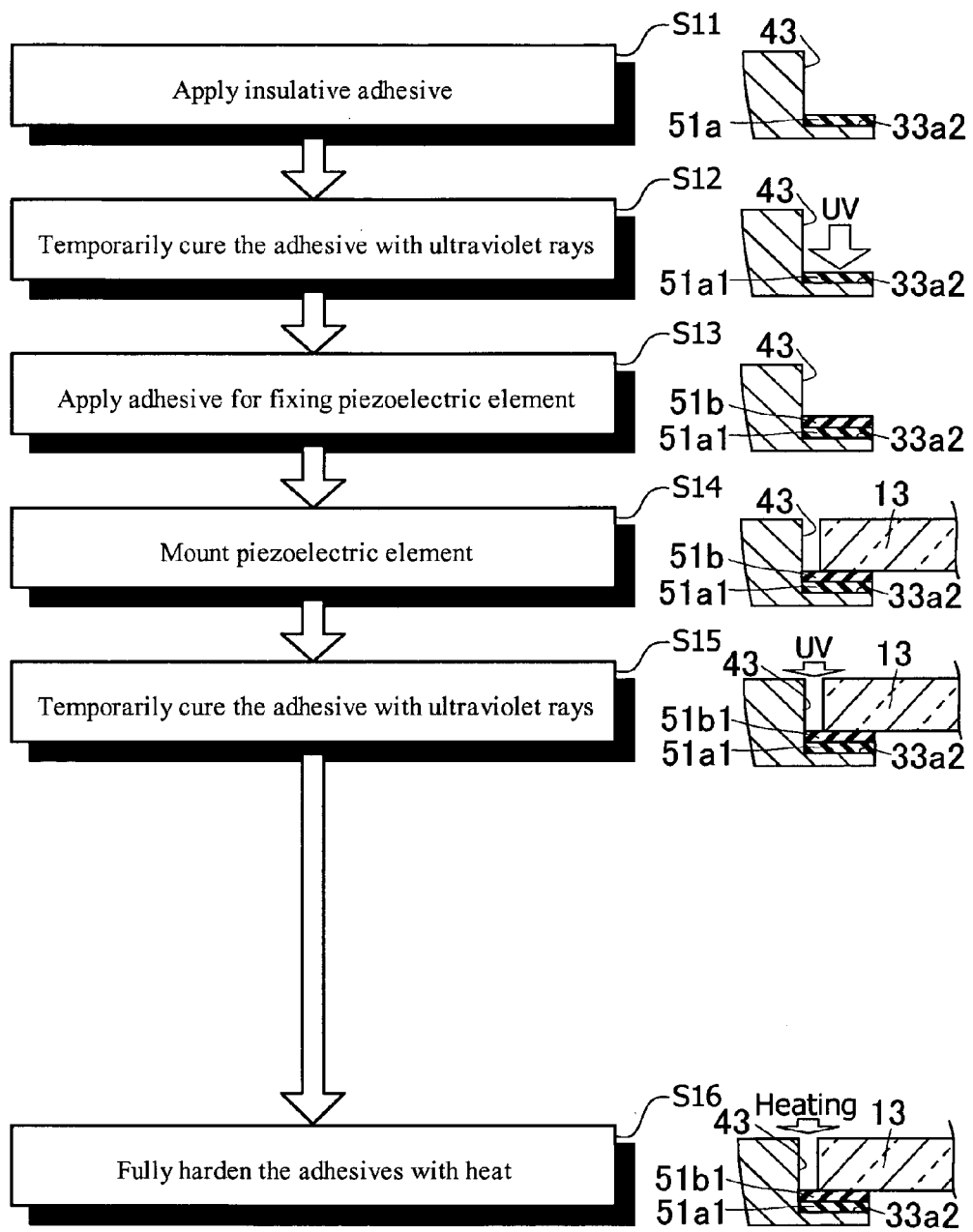
FIG. 7 is a view illustrating a method of manufacturing a head suspension according to an embodiment of the present invention.
Figure 8:
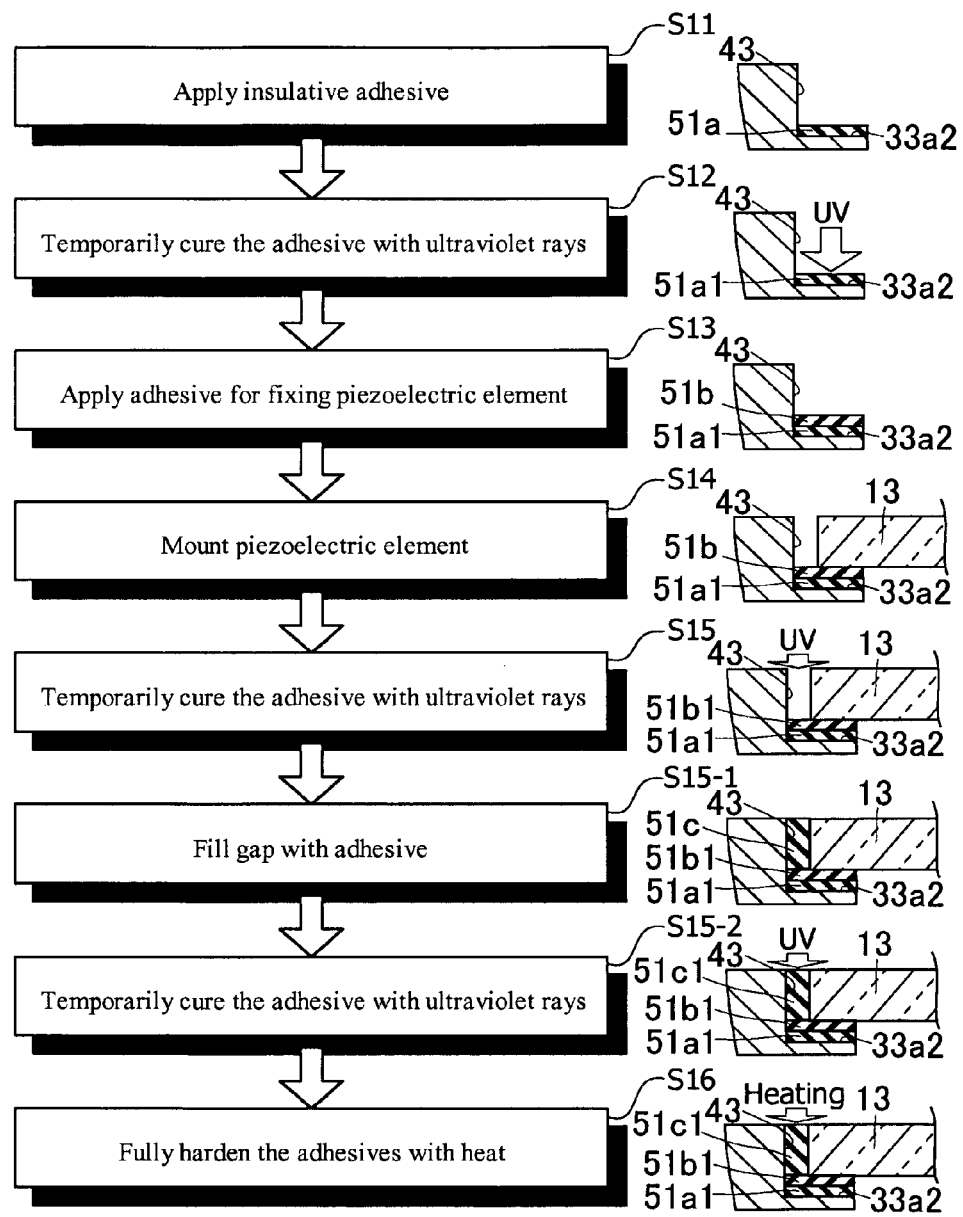
FIG. 8 is a view illustrating a method of manufacturing a head suspension according to another embodiment of the present invention.

FIG. 4 is a bottom view illustrating the head suspension 31 of FIG. 1, FIG. 5A is a sectional view partly illustrating layered adhesives at the opening (attaching part) 43 of the head suspension 31, FIG. 5B is a sectional view partly illustrating layered adhesives according to a modification of the embodiment illustrated in FIG. 5A, FIG. 6 is a schematic view illustrating an adhesive applying system used to apply an adhesive to the piezoelectric element attaching part (the opening 43) of the head suspension 31, FIG. 7 is a view illustrating a process of attaching the piezoelectric element 13 to the attaching part of the head suspension 31, and FIG. 8 is a view illustrating another process of attaching the piezoelectric element 13 to the attaching part of the head suspension 31.

The piezoelectric element 13 is embedded in the opening 43 formed in the base plate 33 of the head suspension 31, so that the first and second electrodes 15 and 17 are on top and the common electrode 19 is at the bottom. The top face of the base plate 33 is flush with the top electrode face of the piezoelectric element 13.

Front and rear ends of the peripheral edge of the opening 43 are partially etched to improve the adhesion of a nonconductive adhesive 51. The partial etching forms supports 33a1 and 33a2. Each of the supports 33a1 and 33a2 has a surface to support the surface of the common electrode 19 of the piezoelectric element 13.

Between the common electrode 19 of the piezoelectric element 13 and the supports 33a1 and 33a2, there are a plurality of adhesive layers including a first nonconductive adhesive layer 51a1 and a second nonconductive adhesive layer 51b1, as illustrated in FIG. 5A.

The first nonconductive adhesive layer 51a1 preferably has a thickness of 10 μm or over, to secure electric insulation between the common electrode 19 and the supports 33a1 and 33a2.

Between the piezoelectric element 13 and each of front and rear vertical walls 43a of the opening 43, there is a gap 50 in which a third nonconductive adhesive layer 51c1 having a proper thickness is arranged.

The head suspension 31 according to the embodiment may employ a conductive adhesive layer 51bb1 (FIG. 5B) instead of the second nonconductive adhesive layer 51b1. In this case, a means to secure electric insulation between the common electrode 19 of the piezoelectric element 13 and the base plate 33 is needed. For this, a first nonconductive adhesive layer 51a2 for covering the vertical walls 43a must be formed at the time when forming the first nonconductive adhesive layer 51a1. The first nonconductive adhesive layers 51a1 and 51a2 form an L-shaped continuous insulating layer to secure electric insulation.

The adhesive layers mentioned above will be explained in detail. The first nonconductive adhesive layers 51a1 and 51a2 are formed by applying and curing a first nonconductive adhesive 51a. The second nonconductive adhesive layer 51b1 is formed by applying and curing a second nonconductive adhesive 51b. The conductive adhesive layer 51bb1 is formed by applying and curing a conductive adhesive. The third nonconductive adhesive layer 51c1 is formed by applying and curing a third nonconductive adhesive 51c.

The first to third nonconductive adhesives 51a, 51b, and 51c may be a nonconductive adhesive of the same kind. In this specification, the "nonconductive adhesive 51" is used as, if not particularly mentioned, a collective representation of the first to third nonconductive adhesives 51a, 51b, and 51c.

In this specification, the "adhesive 51" is used as, if not particularly mentioned, a collective representation of the first to third nonconductive adhesives 51a, 51b, and 51c and conductive adhesive.

The first to third nonconductive adhesives 51a, 51b, and 51c and conductive adhesive may be those that harden with ultraviolet rays or heat.

The nonconductive adhesive 51 may be selected from known nonconductive adhesives including conductive adhesives containing particles of nonconductive material such as silica and glass.

A method of manufacturing the head suspension 31 according to an embodiment of the present invention will be explained.

To apply the nonconductive adhesive 51 to the opening (attaching part) 43, the adhesive applying system 101 illustrated in FIG. 6 is used, for example.

The adhesive applying system 101 includes a syringe 103 having a circular cross section and containing the nonconductive adhesive 51. The syringe 103 has a piston 105 to thrust out the adhesive 51, a discharge needle 107 at a lower end of the syringe 103, and a circular lid 109 at an upper end of the syringe 103. The lid 109 has a hole 115 to draw compressed air from a compressor 111 through an air pipe 113. The air pipe 113 includes a solenoid valve 117. The solenoid valve 117 has an inlet 117A to receive compressed air from the compressor 111, an outlet 117B to supply compressed air, and a discharge port 117C to discharge compressed air out of the air pipe 113. The outlet 117B is selectively connected to one of the inlet 117A and discharge port 117C. The compressor 111 is connected to a drive controller 119 that totally controls an adhesive applying operation.

In the adhesive applying system 101, the drive controller 119 provides an operational instruction as illustrated in FIG. 7. In response to the instruction, the compressor 111 sends compressed air into the syringe 103. Then, the piston 105 descends to squeeze out the first nonconductive adhesive 51a. Under the pressurized state, the adhesive 51a is pushed out of the discharge needle 107. The discharged adhesive 51a is thinly applied to the supports 33a1 and 33a2 as illustrated in FIGS. 5A and 5B. This corresponds to step S11 of FIG. 7. Here, "thinly apply" means that the first nonconductive adhesive 51a applied for electric insulation is thinner than the second nonconductive adhesive 51b applied for fixation in step S13. Thinly applying the first nonconductive adhesive 51a for electric insulation is to minimize the size of the opening (attaching part) 43 as small as possible in consideration of the size of the piezoelectric element 13 that is embedded in the opening 43.

Thereafter, ultraviolet (UV) rays are emitted to the part where the first nonconductive adhesive 51a has been applied, to temporarily set the adhesive 51a. This is step S12 of FIG. 7. This step forms the first nonconductive adhesive layer (thin insulating layer) 51a1 on the supports 33a1 and 33a2.

Steps S11 and S12 correspond to a first time of operation of "applying adhesives to and hardening them at the attaching part one by one."

Thereafter, the drive controller 119 issues a next instruction to send compressed air from the compressor 111 into the syringe 103. Then, the piston 105 descends to squeeze out an instructed quantity of the second nonconductive adhesive 51*b*. Under the pressurized state, the adhesive 51*b* is pushed out of the discharge needle 107 and is applied onto the first nonconductive adhesive layer 51*a*1 formed on the supports 33*a*1 and 33*a*2. This is step S13 of FIG. 7.

Thereafter, the piezoelectric element (PZT) 13 is mounted on the second nonconductive adhesive 51*b* in step S14 of FIG. 7. Ultraviolet rays are emitted to the adhesive applied part, to temporarily cure the adhesive 51*b* in step S15 of FIG. 7. This forms the second nonconductive adhesive layer 51*b*1 over the first nonconductive adhesive layer 51*a*1.

If, in step S14, the piezoelectric element (PZT) 13 is placed by strongly pressing the same toward the first nonconductive adhesive layer 51*a*1, the second nonconductive adhesive layer 51*b*1 will be very thin. Even in such a case, electric insulation will be secured between the common electrode 19 of the piezoelectric element 13 and the supports 33*a*1 and 33*a*2 if the first nonconductive adhesive layer 51*a*1 is formed to a thickness of 10 μm or over.

Steps S13 to S15 correspond to a second time of operation of "applying adhesives to and hardening them at the attaching part one by one." Namely, the example of FIG. 7 applies two times the nonconductive adhesive 51 to the supports 33*a*1 and 33*a*2 formed at the opening (attaching part) 43 of the base plate 33.

Thereafter, step S16 of FIG. 7 heat-treats the head suspension 31 to fully harden the first and second nonconductive adhesive layers 51*a*1 and 51*b*1.

As illustrated in FIGS. 5A and 8, steps S15-1 and S15-2 may be interposed between steps S15 and S16. Step S15-1 fills the gap 50 between the piezoelectric element 13 and the vertical wall 43*a* of the opening (attaching part) 43 with the third nonconductive adhesive 51*c* and step S15-2 emits ultraviolet rays to the part where the adhesive 51*c* has been applied, to temporarily cure the adhesive 51*c*. Steps S11 to S16 of FIG. 8 are the same as steps S11 to S16, and therefore, are not explained again.

Steps S15-1 and S15-2 correspond to a third time of operation of "applying adhesives to and hardening them at the attaching part one by one." Namely, the example of FIG. 8 applies three times the nonconductive adhesive 51 to the supports 33*a*1 and 33*a*2 formed at the opening (attaching part) 43 of the base plate 33.

According to the embodiment, a part where the base plate 33 and connection plate 37 overlap corresponds to the drive side Y of the piezoelectric actuator 11.

The piezoelectric element 13 is positioned at a predetermined location by an inner circumferential face of the opening 43. As illustrated in FIGS. 5A and 5B, wiring 55 (made of copper, for example) of the flexure 39 and the common electrode 19 of the piezoelectric element 13 are exposed to face each other. Between the wiring 55 and the common electrode 19, there is a slight space of several tens of micrometers. To electrically connect the wiring 55 and the common electrode 19 to each other in the slight space, a conductive adhesive 57 is arranged in the slight space as illustrated in FIGS. 5A and 5B. Instead of the conductive adhesive 57, a bonding wire, soldering, ultrasonic bonding, or any other connecting technique may be employed to electrically connect the wiring 55 and the common electrode 19 to each other.

To electrically connect the first and second electrodes 15 and 17 of the piezoelectric element 13 to the base plate 33, a pair of conductive adhesives 53*a* and 53*b* is arranged. In FIGS. 5A and 5B, a numeral 59 is a metal base of the flexure 39 and 61 is an electrical insulating layer of the flexure 39.

Operation of the head suspension 31 according to the embodiment will be explained. It is assumed that the first and second electrodes 15 and 17 of the piezoelectric element 13 are grounded and the common electrode 19 thereof receives a predetermined voltage.

The end face 23 of the first electrode 15 contracts and the end face 25 of the second electrode 17 extends as illustrated in FIG. 2, and therefore, the piezoelectric element 13 deforms into a trapezoid. Namely, the piezoelectric element 13 minutely moves in the direction Z to move the load beam 35 on the drive side Y in a sway direction (a widthwise direction of the head suspension 31). If the common electrode 19 is grounded and the first and second electrodes 15 and 17 receive a predetermined voltage, the piezoelectric element 13 minutely moves in the direction −Z to move the load beam 35 on the drive side Y in a sway direction.

The head suspension 31 incorporating the piezoelectric actuator 11 needs three electric systems for the first and second electrodes 15 and 17 and common electrode 19 of the piezoelectric element 13. This configuration makes wiring work to the piezoelectric element 13 easy and reliable.

The base plate 33 accommodates the piezoelectric element 13 in the opening 43 and supports the same from below. The opening 43 of the base plate 33 surrounds the piezoelectric element 13, to easily position the piezoelectric element 13 and protect the brittle piezoelectric element 13 from being damaged.

The common electrode 19 and wiring 55 facing each other are electrically connected to each other through a single connection (the conductive adhesive 57). This configuration reduces the number of wires arranged on the flexure 39 and increases the number of flexures to be produced from a material.

Compared with a head suspension using a pair of piezoelectric elements, the head suspension 31 according to the embodiment employs the single piezoelectric element 13, to reduce the number of parts, simplify parts management, and reduce the cost of the head suspension 31.

The head suspension 31 according to the embodiment arranges the supports 33*a*1 and 33*a*2 in the opening (attaching part) 43, to support the common electrode 19 of the piezoelectric element 13. The piezoelectric element 13 is fixed to the supports 33*a*1 and 33*a*2 with a plurality of adhesive layers (the first nonconductive adhesive layer 51*a*1 and second nonconductive adhesive layer 51*b*1). Among the plurality of adhesive layers, the adhesive layer (first nonconductive adhesive layer 51*a*1) that is in contact with the supports 33*a*1 and 33*a*2 is electrically insulative.

The head suspension 31 according to the embodiment, therefore, properly maintains electric insulation between the piezoelectric element 13 and the opening (attaching part) 43 and fully functions.

The method of manufacturing a head suspension according to the embodiment repeats the operation of applying the adhesive 51 to the opening (attaching part) 43 and hardening the adhesive 51 a plurality of times, to fix the piezoelectric element 13 to the opening (attaching part) 43. Among the plurality of times of the operation, the adhesive 51 applied at least in the first time of the operation is electrically insulative.

The adhesive (first nonconductive adhesive 51*a*) applied in the first operation secures electric insulation between the piezoelectric element 13 and the opening (attaching part) 43, so that the head suspension 31 may fully function.

After the plurality of times of repetition of the operation, the adhesives 51 are strongly hardened at the opening (attaching part) 43, and therefore, never ooze or spread.

The method of manufacturing a head suspension according to the embodiment, therefore, secures electric insulation between the piezoelectric element 13 and the opening (attaching part) 43, allows the head suspension 31 to fully function, and secures the rigidity balance and proper vibration characteristic of the head suspension 31.

Every adhesive used in the plurality of times of repetition of the operation may be electrically insulative. This improves an insulating capability compared with a case that employs a conductive adhesive in each adhesive applying operation except the first adhesive applying operation.

According to the embodiment, the first adhesive applying operation (steps S11 and S12 of FIGS. 7 and 8) secures electric insulation and the following adhesive applying operations (steps S13 to S15 of FIGS. 7 and 8 and steps S15-1 and 15-2 of FIG. 8) secure the electric insulation and fixation of the piezoelectric element 13.

Compared with the related art that electrically insulates and fixes the piezoelectric element 13 in one time of adhesive applying operation, the embodiment needs no wide space or a design margin between the piezoelectric element 13 and the opening (attaching part) 43.

Accordingly, the method of manufacturing a head suspension according to the embodiment can minimize the size of the opening (attaching part) 43 as small as possible in consideration of the size of the piezoelectric element 13 that is embedded in the opening 43. The head suspension of the embodiment can flexibly cope with a miniaturization requirement.

Among the plurality of repetition of the adhesive applying operation, the first adhesive applying operation may employ an electrically insulative adhesive and the following adhesive applying operations may each employ an adhesive that is not electrically insulative. For example, the second and later adhesive applying operations (steps S13 to S15 of FIGS. 7 and 8 and steps S15-1 and 15-2 of FIG. 8) may employ, as the adhesive 51, a conductive adhesive containing no insulative material such as silica grains or glass grains.

This technique improves bonding strength to strongly fix the piezoelectric element 13 to the opening (attaching part) 43, compared with a case employing a nonconductive adhesive containing insulative silica or glass particles for the second and later adhesive applying operations.

The method of manufacturing a head suspension according to the embodiment arranges the nonconductive adhesive 51 between the piezoelectric element 13 and the opening (attaching part) 43, to correctly transmit a displacement of the piezoelectric element 13 to the load beam 35, and at the same time, secures electric insulation between the common electrode 19 of the piezoelectric element 13 and the base plate 33.

A method of manufacturing a head suspension according to another aspect of the present invention will be explained. This aspect applies (like step S11 of FIG. 7) a nonconductive adhesive (first nonconductive adhesive 51*a*) for electric insulation to the opening (attaching part) 43, temporarily sets (like step S12 of FIG. 7) the nonconductive adhesive 51*a* to form an insulating adhesive layer (first nonconductive adhesive layer 51*a*1), applies (like step S13 of FIG. 7) an adhesive (second nonconductive adhesive 51*b*) for fixing the piezoelectric element 13 to the opening (attaching part) 43 where the insulating adhesive layer 51*a*1 has been formed, places (like step S14 of FIG. 7) the piezoelectric element 13 in the opening (attaching part) 43 where the fixing adhesive 51*b* has been applied, temporarily sets (like step S15 of FIG. 7) the fixing adhesive 51*b* after the placement of the piezoelectric element 13, to form a fixing adhesive layer (second nonconductive adhesive layer 51*b*1), and fully hardens (like step S16 of FIG. 7) the insulating nonconductive adhesive (first nonconductive adhesive 51*a*) and fixing adhesive (second nonconductive adhesive 51*b*), to fix the piezoelectric element 13 to the opening (attaching part) 43.

The method of manufacturing a head suspension according to the above-mentioned aspect secures proper electric insulation between the piezoelectric element 13 and the opening (attaching part) 43, allows the head suspension 31 to fully function, and secures the rigidity balance and proper vibration characteristic of the head suspension 31.

The nonconductive adhesive for electric insulation and the adhesive for fixation mentioned above are those that harden with ultraviolet rays or heat. Temporarily curing such adhesives may be carried out with ultraviolet rays and fully hardening such adhesives may be carried out with heat.

The adhesive for fixation may be a conductive adhesive or a nonconductive adhesive. If the adhesive for fixation is a conductive adhesive, it will improve bonding strength to strongly fix the piezoelectric element 13 to the opening (attaching part) 43, compared with a case employing a nonconductive adhesive containing insulative silica or glass particles for the second and later adhesive applying operations.

The method of manufacturing a head suspension according to the above-mentioned aspect may carry out, between forming the fixing adhesive layer and fixing the piezoelectric element, filling the gap 50 between the piezoelectric element 13 and the opening (attaching part) 43 with an adhesive 51 (corresponding to step S15-1 of FIG. 8) and temporarily curing the adhesive 51 in the gap 50 (corresponding to step S15-2 of FIG. 8).

The adhesive 51 interposed between the piezoelectric element 13 and the opening (attaching part) 43 correctly transmits a distortion (displacement) of the piezoelectric element 13 to the load beam 35.

The piezoelectric element fixing operation may fully harden the insulating nonconductive adhesive (first nonconductive adhesive 51*a*), the fixing adhesive (second nonconductive adhesive 51*b*), and the adhesive (third nonconductive adhesive 51*c*) in the gap 50, to fix the piezoelectric element 13 to the opening (attaching part) 43.

The adhesive (third nonconductive adhesive 51*c*) to be applied into the gap 50 may be a nonconductive adhesive.

The nonconductive adhesive 51*c* interposed between the piezoelectric element 13 and the opening (attaching part) 43 correctly transmits a distortion (displacement) of the piezoelectric element 13 to the load beam 35 and secures electric insulation between the common electrode 19 of the piezoelectric element 13 and the base plate 33.

The present invention is not limited to the above-mentioned embodiment and is modifiable without departing from the gist and technical idea thereof mentioned in the claims and specification. Head suspensions and manufacturing methods of head suspensions according to such modifications also fall in the scope of the present invention.

For example, according to a modification of the present invention, the flexible parts 41*a* and 41*b* and the opening 43 are formed on the actuator plate 34 instead of the base plate 33. For this, the term "base plate" means the base plate 33 alone or the base plate 33 plus the actuator plate 34. Accordingly, the "base" stipulated in the claims may be read as a base plate or an actuator plate. For example, the opening (attaching part) formed in the base plate (base) may be read as the opening (attaching part) formed in the actuator plate (base).

Figure 9:
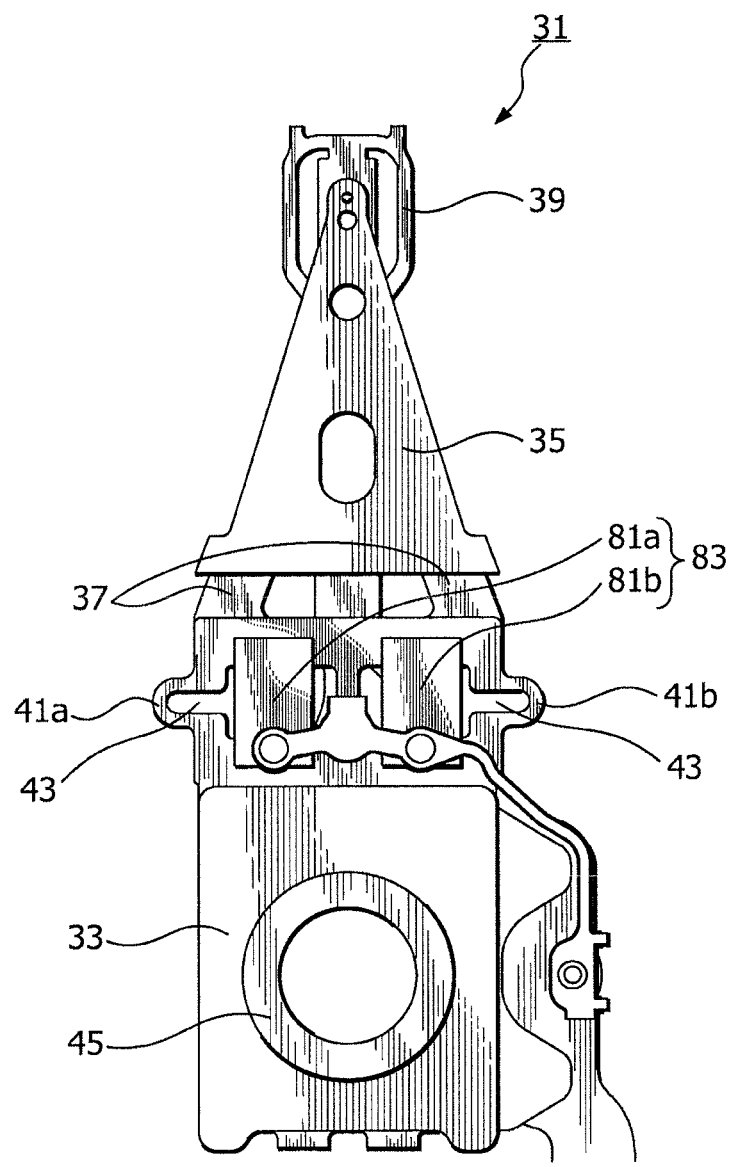
FIG. 9 is a plan view illustrating a head suspension according to a modification of the present invention.

According to the embodiment, the piezoelectric actuator 11 employs one piezoelectric element 13 that is positioned in the opening 43 of the base plate 33. This does not limit the present invention. According to another modification of the present invention illustrated in FIG. 9, a piezoelectric actuator 83 employs a pair of piezoelectric elements 81a and 81b and the piezoelectric elements 81a and 81b are set in an opening (attaching part) 43 of a base plate 33 with an adhesive (or adhesives) applied according to the present invention.

The adhesive 51 adopted by the present invention may be a special adhesive having a thixotropic characteristic made by adding a thixotropic agent to a known nonconductive adhesive (made by, for example, adding insulative particles such as silica particles and glass particles to a conductive adhesive). Such a thixotropic adhesive 51 is sol when applied to the gap 50.

The thixotropic agent prevents the known nonconductive adhesive from dropping or spreading when applied to an object. The thixotropic agent may be selected from a group including pulverized silica, ground silica, organic bentonite, talc, smectite, clay, polyamide resin, and the like.

The thixotropic adhesive 51 in sol is applied to the gap 50 between the piezoelectric element 13 and the opening (attaching part) 33 of the head suspension 31. Since the adhesive 51 is sol, it is easily applied to the gap 50.

The thixotropic adhesive 51 that is sol when applied gradually changes to gel and loses fluidity, and therefore, the applied adhesive 51 never oozes or disperses.

It will be easy, therefore, to control the applying quantity of the adhesive 51, automate the application process of the adhesive 51, and secure a proper rigidity balance and vibration characteristic for the head suspension 31.

What is claimed is;

1. A head suspension having a piezoelectric element that deforms in response to a voltage applied thereto, a base having an opening serving as an attaching part to which the piezoelectric element is attached, and a load beam that is fixed to the base so that a front end of the load beam moves in a sway direction according to the deformation of the piezoelectric element, the head suspension comprising:
   a support formed in the opening, configured to support an electrode surface of the piezoelectric element; and
   a plurality of laminated adhesive layers formed on the support, to fix the piezoelectric element to the support in a laminating direction in which the adhesive layers are laminated one on another, the plurality of laminated layers being positioned between the support and the piezoelectric element in said laminating direction and one of the laminated adhesive layers that is in contact with the support being electrically insulative.

* * * * *